April 1, 1924.
H. A. NICHOLSON
1,488,701
HEATING SYSTEM AND PLANT THEREFOR
Filed Nov. 30, 1918
2 Sheets-Sheet 2
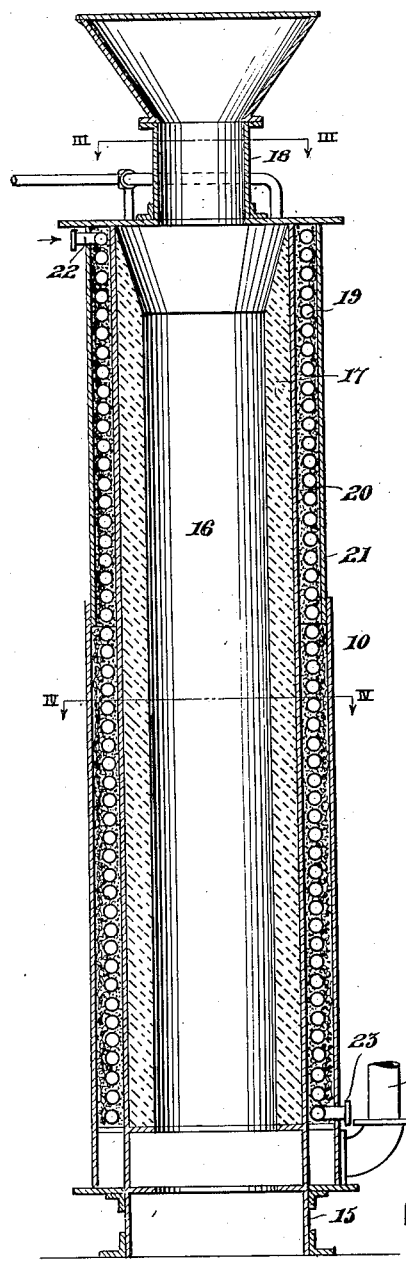
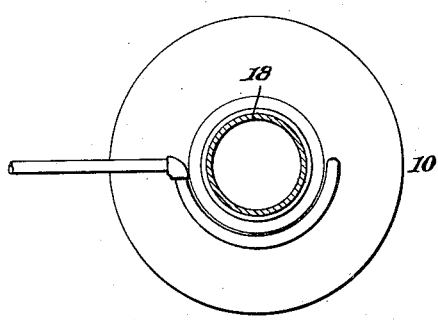
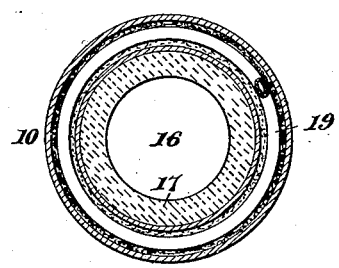
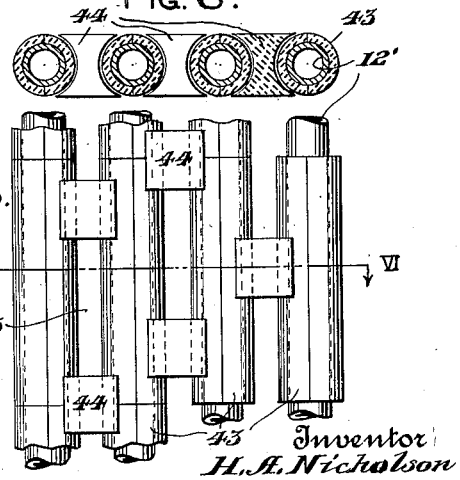
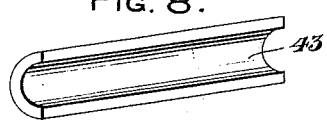
Inventor
H. A. Nicholson
By H. van Oldemeel
Attorney Patented Apr. 1, 1924.

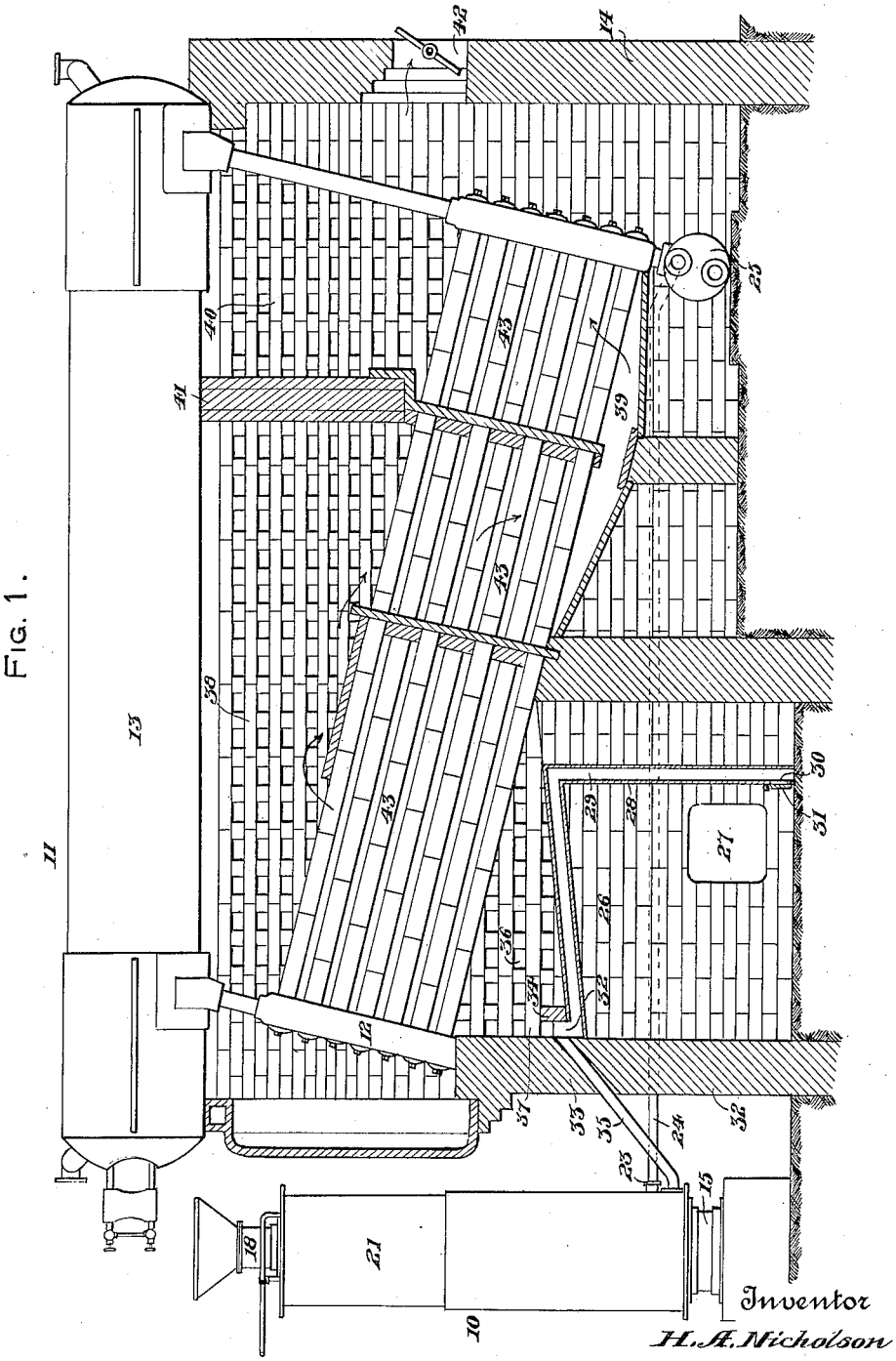

1,488,701

UNITED STATES PATENT OFFICE.

HENRY ANGUS NICHOLSON, OF AUCKLAND, NEW ZEALAND, ASSIGNOR TO ERNEST A. CRAIG, OF AUCKLAND, NEW ZEALAND.

HEATING SYSTEM AND PLANT THEREFOR.

Application filed November 30, 1918. Serial No. 264,788.

*To all whom it may concern:*

Be it known that I, HENRY ANGUS NICHOLSON, a subject of the King of England, residing at Auckland, and provincial district of Auckland, New Zealand, have invented certain new and useful Improvements in Heating Systems and Plants Therefor, of which the following is a specification.

The primary object of the invention is the provision of a system of heating primarily designed for the generation of steam quickly and economically with comparatively slight expense for installation.

A further object of the invention is to provide an economical gas producer in connection with a structure for utilizing the produced gas for the creation of steam, the apparatus and heating system being serviceable wherever quick and cheap steam are desired, such as heating plants and locomotives as well as marine and any other type of boilers.

It is known that gases must be maintained at the ignition point for producing efficiency in heating because the lowering of the temperature of gases below the ignition point causes the incandescent carbon to change into smoke which can only be returned to a high heating medium by reheating to incandescence. My system therefore contemplates the production of gas by a producer which gas is conducted in its incandescent state to a place of heating water for producing steam at a point so approximate to the point of gas production that the gas remains incandescent during its travel through the heating means, while heat imparting members of the latter are rendered and maintained incandescent by the said gases, it being additionally noted that the water of the heating means is initially raised in temperature prior to this introduction into the heating means of the system.

A further object of the invention is the provision of a heating and steam generating system in the firing of which, a strong draft is not required nor desirable, the draft only serving to cause a continuous flow of the heating medium maintained at a point of incandescence throughout the system whereby an exceedingly high constant heat is uniformly maintained during operation. Within the contemplation of my invention is the application of what is ordinarily waste heat to heat the feed water and smokeless gas firing by gas producers having well known economy and greatly reducing the fuel expenses as well as that of attendants. The operation of the system is smokeless, affording perfect combustion, and may be employed in house and building plants, the gas producer employed being comparatively small and compact and in the case of boilers, doing away with the burning grate and ash pit thereof. The economy and merit of the system will be at once apparent as a small gas producer not only furnishes the heating medium for the entire plant but also initially heats feed water for the plant.

With these general objects in view and others that will become apparent as the nature of the invention is better understood, the same consists of the novel combination and arrangement of parts hereinafter more fully described, illustrated in the accompanying drawings and then claimed.

In the drawings forming a part of this application, in which like designating characters refer to corresponding parts throughout the several views, Figure 1 is a vertical longitudinal sectional view through a boiler structure utilizing my system of heating with the gas producer shown in elevation.

Figure 2 is a vertical longitudinal sectional view of the gas producer.

Figures 3 and 4 are horizontal transverse sectional views thereof taken upon lines III—III and IV—IV, respectively of Fig. 2.

Figure 5 is a plan elevation of portions of water tubes for a boiler illustrating a manner of heat conduction employed therewith.

Figure 6 is a transverse sectional view taken upon line VI—VI of Fig. 5.

Figure 7 is a radiating member employed as a spacer and

Figure 8 is a perspective view of a section of a radiating member used to cover or encase the water tubes.

Referring more in detail to the drawings, I have illustrated my system in connection with a form of gas producer 10 installed with a Babcock & Wilcox form of boiler 11 having the usual header 12 connected to the steam drum 13 and employing the brick setting 14.

The gas producer 10 includes a base 15 for a suitable burner in starting the ignition of coal or coke within the chamber 16 of the producer, it being understood that a suitable lining 17 of vitrified material is provided therefor while a hopper inlet member 18 is mounted upon the top of the producer for charging the same. A water tube coil 19 is provided between spaced walls 20 and 21 outwardly of the lining 17 of the producer, water being furnished to the inlet end 22 of the coil adjacent the top of the producer by any suitable means such as a pump.

The outlet end 23 of the coil 19 is arranged adjacent the pump of the producer and is connected by suitable piping such as 24 with the water inlet drum 25 at the lower end of the header 12. A space 26 in the lower forward portion of the boiler member 11 ordinarily corresponding to the firebox receives outside air from an opening 27 in the side thereof. A suitable inner wall 28 is provided for the chamber 26 having an air conducting space 29 therein into which air enters from an opening 30 from the chamber 26 under the control of a damper 31.

The air from the space 29 passes through an opening 32 to a point thereabove and inwardly of the front wall 33 of the furnace at a point adjacent a baffle plate 34 positioned transversely of the furnace structure. The gas generated by the producer 10 is led through the wall 33 by means of a pipe 35 opening adjacent the baffle plate 34 and whereby the gas from the producer 10 mixes with the air from the air admission space 29 heretofore described. When coke is employed for burning in the producer 10, the pipe 35 is utilized connected as described adjacent the bottom of the producer.

The gas from the producer 10 is mixed with quantities of air adjacent the baffle plate 34 under the regulation of the air inlet damper 31, the length of the connecting pipe 35 being so short that the incandescent gases are prevented from cooling and are introduced into the heating chamber 36 above the chamber 26 in an incandescent form. Checkered brickwork 37 in the chamber 36 being formed of vitrified material also becomes incandescent by the action of the gas and this is also true of checkered brickwork 38 above the water tubes 12 through which the incandescent gas passes going downwardly to the space 39 beneath the tubes, then upwardly through the checkered brickwork 40 rearwardly of the baffle 41 and thence to the outlet or discharge flue opening 42 in the rear wall of the furnace.

All of the vitrified or fire brick forming the checker work 37, 38, and 40 becomes incandescent as well as the vitrified covering or casings 43 provided upon the separate water tubes 12′ of the header 12, the encased tubes being spaced apart to form flame passages. Also, spacing blocks 44 are provided between the tubes formed of similar vitrified material, the said blocks being substantially X-shaped in cross section for fitting upon the casings 43 of adjacently positioned tubes, the blocks being spaced apart as found desirable, such as in staggered relations as illustreated in Figure 5 of the drawings and providing spaces 45 therebetween for the passage of the incandescent gas through the bank of tubes.

The producer 10 having been once fired, the heated gas in an incandescent state enters the heating chamber 36, the filling of which as well as the remainder of the travel space of the furnace is soon heated to incandescent as well as the casing 43 and blocks 44. The checkered work 37, 38, and 40 and the casings 43 and blocks 44 being heated to a white heat, the gases travel therethrough for heating the multiplicity of water pipes 12′ as maintained incandescent and substantially the entire body within the furnace surrounding the bank 12 is maintained substantially incandescent by the incoming incandescent gas from the producer 10 so that the incandescent gas is prevented from cooling and the flames are not quenched and no smoke is formed until the outlet 42 is reached. The incandescent body within the furnace renders a strong draft unnecessary and undesirable as the slow passage of the incandescent gas permits the full utilization of the contained heat units. The water in the header 12 is initially heated before its admission to the entrance drum 25 by means of the coils 19 of the producer 10, this heating takes place without substantially any consummation of heat other than that which would be necessary in providing an ordinary heat insulating casing for the gas producer. It will be understood that the supply of water to the coil inlet 22 maintains water in the steam drum 13 constant in the ordinary manner. The checker work and vitrified members serve as heat retainers as well as retarders for the flow of incandescent gas and preserve an even balance of temperature. A maximum heat is thereby produced as well as the consequent maximum amount of steam and the inexpensively produced gas is completely utilized for giving up its full heat units, the complete system being unitary in itself forming a most efficient plant of the class described.

While the form of the invention herein shown and described is what is believed to be the preferred embodiment thereof, it will nevertheless be understood that minor changes may be made therein in the proportion of parts and details of construction without departing from the spirit and scope of the invention as claimed, as for example the bricks and casings may be made of either vitrified or other similar refractory material, such that it may become incandescent, as set forth.

What I claim is:

1. A boiler comprising a bank of water-tubes, means in which said water-tubes are ensconced, for preventing quenching of the flames by the water-tubes, and securing substantially complete combustion of the fuel by a slow draft, comprising vitrified casings individual to the water-tubes and spaced apart to form flame passages and completely enclosing all of the water-tubes and to be rendered incandescent by the flames, and checkered vitrified brickwork in which the system of encased water-tubes is set, including brickwork overlying the water-tubes, said brickwork to be rendered incandescent by the flames, together with said vitrified casings, whereby the water is caused to circulate in an incandescent body.

2. A water-tube boiler comprising a bank of water-tubes, means in which said water-tubes are ensconced, for preventing quenching of the flames by the water-tubes, comprising separated individual vitrified casings for said tubes, vitrified blocks positioned between said encased tubes to space them apart, checkered brickwork above and below said tubes forming gas passages, the gas passing through the lower and upper brickwork and between the casings of the tubes, and means adapted for admitting incandescent gas in the brickwork beneath the tubes, whereby all of the brickwork casings and blocks are maintained in uniform substantially incandescent heated condition.

3. A water-tube boiler comprising a bank of water-tubes, heating means, and means for preventing quenching of the flames by the water-tubes, and thereby securing substantially complete combustion of the fuel, comprising individual vitrified casings completely enclosing all of the water-tubes, to be rendered incandescent by the flames, said individual casings spaced apart to form flame passages.

4. A water-tube boiler comprising a bank of water-tubes and heating means, vitrified cylindrical individual casings upon all the water-tubes to be rendered incandescent by the flames, and to prevent quenching of the flames by contact with the water-tubes, said encased tubes being all spaced apart from one another, and spacing blocks of vitrified material arranged among the tubes, said spacing blocks having opposite semi-cylindrical depressions to fit upon the casings.

In testimony whereof I affix my signature.

HENRY ANGUS NICHOLSON.